United States Patent [19]

Moser et al.

[11] Patent Number: 5,077,396

[45] Date of Patent: Dec. 31, 1991

[54] AZO COMPOUNDS CONTAINING TWO 6-HYDROXYPYRID-2-ONE COUPLING COMPONENT RADICALS THE NITROGEN ATOMS OF WHICH ARE LINKED BY A BISCATIONIC RADICAL

[75] Inventors: Helmut A. Moser, Oberwil, Switzerland; Roland Wald, Huningue, France

[73] Assignee: Sandoz Ltd., Basel, Switzerland

[21] Appl. No.: 523,161

[22] Filed: May 14, 1990

Related U.S. Application Data

[63] Continuation of Ser. No. 417,361, Oct. 5, 1989, abandoned.

[30] Foreign Application Priority Data

Oct. 5, 1988 [DE] Fed. Rep. of Germany ....... 3833858

[51] Int. Cl.⁵ .................. C09B 44/08; C09B 44/12; D06P 1/41; D21H 21/28
[52] U.S. Cl. .................................. 534/606; 534/573; 534/605; 8/639; 8/654; 8/655
[58] Field of Search ............... 534/604, 605, 606, 608, 534/610, 573 M; 8/639, 654, 655

[56] References Cited

U.S. PATENT DOCUMENTS

| | | | |
|---|---|---|---|
| 3,635,940 | 1/1972 | Hegar et al. | 534/604 |
| 3,755,287 | 8/1973 | Hegar et al. | 534/604 |
| 4,083,842 | 4/1978 | Burkhard et al. | 534/758 |
| 4,087,244 | 5/1978 | Greve et al. | 534/610 X |
| 4,213,898 | 7/1980 | Entschel et al. | 534/604 |
| 4,228,072 | 10/1980 | Greve | 534/604 |
| 4,634,764 | 1/1987 | Greve | 534/608 X |
| 4,675,388 | 6/1987 | Greve et al. | 534/608 |
| 4,742,161 | 5/1988 | Dore | 534/606 |

FOREIGN PATENT DOCUMENTS

| | | | |
|---|---|---|---|
| 1924770 | 11/1970 | Fed. Rep. of Germany | 534/606 |
| 1297116 | 11/1972 | United Kingdom | 534/604 |
| 2173210 | 10/1986 | United Kingdom | 534/608 |

*Primary Examiner*—Mary C. Lee
*Assistant Examiner*—Fiona T. Powers
*Attorney, Agent, or Firm*—Gerald D. Sharkin; Richard E. Vila; Melvyn M. Kassenoff

[57] ABSTRACT

Compounds of the formula

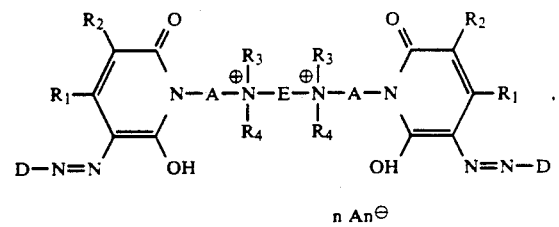

n An⊖ wherein each A is independently linear or branched $C_{2-6}$alkylene or linear or branched $C_{3-6}$alkylene substituted by hydroxy, each D is independently the radical of a diazo component of the benzene, azobenzene or naphthalene series, E is a divalent radical attached to each $-NR_3R_4-$ radical through an aliphatic carbon atom, each $R_1$ is independently hydrogen, $C_{1-4}$alkyl, cyclohexyl, phenyl or phenyl($C_{1-2}$alkyl), each $R_2$ is independently hydrogen, cyano, $-COOR_5$, $-CONR_6R_7$ or

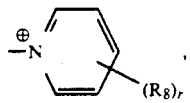

wherein $R_5$ is hydrogen, $C_{1-4}$alkyl or phenyl ($C_{1-2}$alkyl), each of $R_6$ and $R_7$ is independently hydrogen or $C_{1-4}$alkyl, each $R_8$ is independently $C_{1-4}$alkyl, and r is 0, 1, 2 or 3, each $R_3$ is independently $C_{1-4}$alkyl or $C_{1-4}$alkyl monosubstituted by halo, cyano, hydroxy or phenyl, each $R_4$ is independently hydrogen, $C_{1-4}$alkyl or $C_{1-4}$alkyl monosubstituted by halo, cyano, hydroxy or phenyl, each $An^\ominus$ is a non-chromophoric anion, and n is 0, 1, 2, 3, 4, 5 or 6, with the proviso that the negative charges of the $An^\ominus$'s balance the positive charge of each cationic group of the molecule not balanced by the negative charge of an anionic group of the molecule.

19 Claims, No Drawings

AZO COMPOUNDS CONTAINING TWO 6-HYDROXYPYRID-2-ONE COUPLING COMPONENT RADICALS THE NITROGEN ATOMS OF WHICH ARE LINKED BY A BISCATIONIC RADICAL

This is a continuation of application Ser. No. 07/417,361, filed Oct. 5, 1989, now abandoned.

The invention relates to basic pyridone disazo to tetrakisazo compounds, a process for their production and their use in dyeing and printing processes.

There is provided according to the invention compounds of formula I and mixtures thereof

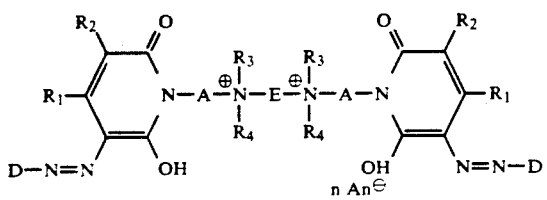

in which
each $R_1$ independently is hydrogen, $C_{1-4}$alkyl, cyclohexyl, phenyl or phenyl ($C_{1-2}$alkyl)
each $R_2$ independently is hydrogen, —CN, —COOR$_5$, —CONR$_6$R$_7$,

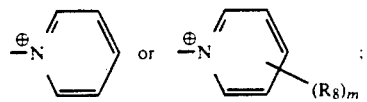

$R_5$ is hydrogen, $C_{1-4}$alkyl or phenyl ($C_{1-2}$alkyl);
each $R_6$ and $R_7$ independently is hydrogen or $C_{1-4}$alkyl;
m is 1, 2 or 3;
each $R_8$ independently is $C_{1-4}$alkyl;
each $R_3$ independently is $C_{1-4}$alkyl, unsubstituted or monosubstituted by halogen, cyano, hydroxy or phenyl;
each $R_4$ independently is hydrogen or has a significance of $R_3$, independent of $R_3$;
each A independently is $C_{2-6}$alkylene or $C_{3-6}$alkylene substituted by hydroxy;
E is a divalent bridging member attached to each N$\oplus_3$R$_4$— Radical through an aliphatic carbon atom;
each D, independently, is the radical of a diazo component selected from the benzene, azobenzene, or naphthalene series which may contain a water-solubilizing group selected form SO$_3$H, COOH and SO$_2$NH$_2$;
An$\ominus$ is a non-chromophoric anion; and
n is the number of negative charges which are necessary to compensate the positive charges present in the molecule which are not compensated by any anionic groups in D. Preferably n is 0 or an integer from 1 to 6.

Preferably number of cationic groups in a compound of the formula I exceeds the number of anionic groups in both groups D.

Preferably there are no anionic groups (SO$_3$H or COOH) other than those in a group D present in a compound of formula I.

Any gorup capable of being linear or branched is linear or branched unless indicated to the contrary.

When a hydroxy-substituted alkyl or alkylene group is bonded to nitrogen, the hydroxy group is preferably located at a C-atom which is not directly bonded to nitrogen (i.e. is not attached to the α-carbon atom).

Preferably halogen is fluorine, chlorine or bromine, more preferably chlorine or bromine and especially chlorine.

Preferably $R_1$ is $R_{1a}$ where each $R_{1a}$ independently is methyl, ehtyl, cyclohexyl, phenyl or benzyl.

More preferably $R_1$ is $R_{1b}$ where each $R_{1b}$ independently is methyl or ethyl.

More preferably $R_1$ is methyl.

Preferably $R_2$ is $R_{2a}$ where each $R_{2a}$ independently is hydrogen, cyano, —COOR$_{5a}$, —CONR$_{6a}$R$_{7a}$,

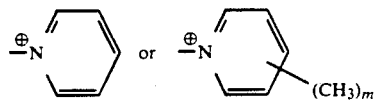

where $R_{5a}$, $R_{6a}$ and $R_{7a}$ are defined below.

More preferably $R_{2b}$ where each $R_{2b}$ independently is hydrogen, 13 COOR$_{5a}$, —CONHR$_{7a}$,

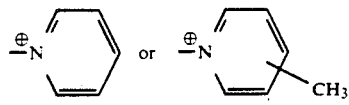

Most preferably $R_{2c}$ where each $R_{2c}$ independently is

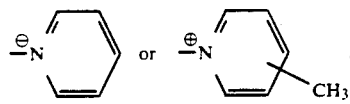

Preferably when $R_3$ or $R_4$ is unsubstituted alkyl, it is $C_{1-2}$alkyl, more preferably methyl. Preferably when $R_3$ or $R_4$ is substituted alkyl, it is $C_{2-3}$alkyl which is monosubstituted by chlorine or hydroxy.

Preferably $R_3$ is $R_{3a}$ where each $R_{3a}$ independently is methyl, ethyl or $C_{2-3}$alkyl monosubstituted by hydroxy or chlorine.

More preferably $R_3$ is $R_{3b}$ where each $R_{3b}$ independently is methyl, ethyl or 2-hydroxyethyl.

Most preferably $R_3$ is methyl.

Preferably $R_4$ is $R_{4a}$ where each $R_{4a}$ independently is hydrogen or a significance of $R_{3a}$ independent of $R_{3a}$.

More preferably $R_4$ is $R_{4b}$ where each $R_{4b}$ independently hydrogen or a significance of $R_{3b}$, independent of $R_{3b}$.

Most preferably $R_4$ is methyl.

Preferably $R_5$ is $R_{5a}$ where $R_{5a}$ is hydrogen, methyl or ethyl.

Preferably $R_6$ and $R_7$ are $R_{6a}$ and $R_{7a}$ which independently are hydrogen or $C_{1-2}$alkyl.

Preferably $R_8$ is methyl.

Preferably when A is alkylene, it is $C_{2-4}$alkylene (more preferably —(CH$_2$)$_p$— in which p=2, 3 or 4; —CH$_2$—CH(CH$_3$)—; CH$_2$—CH(CH$_2$CH$_3$)—; or —CH(CH$_3$)—CH(CH$_3$)— of which —(CH$_2$)$_{p'}$—, in which p'=2 or 3 is most preferred).

Preferably when A is hydroxy-substituted alkylene, it is hydroxy-$C_{3-4}$alkylene.

Preferably A is $A_1$ where each $A_1$ independently is $C_{2-4}$alkylene or monohydroxy-substituted $C_{3-4}$alkylene.

More preferably A is $A_2$ where each $A_2$ independently is $C_{2-4}$alkylene.

Most preferably A is $A_3$ where each $A_3$ independently is —$(CH_2)_{p'}$—, where $p'$ is 2 or 3.

Preferably E is $E_{1a}$ where $E_{1a}$ is unsubstituted $C_{2-4}$alkylene, monohydroxy-substituted $C_{3-4}$alkylene, $C_{2-6}$alkylene interrupted by —O—, —$NR_9$— or

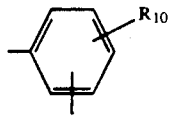

where $R_{10}$ is as defined below; or monohydroxy- or dihydroxy-substituted $C_{3-8}$alkylene which is interrupted by —O—, —$NR_9$— or

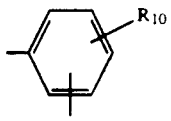

in which
$R_9$ is hydrogen or $C_{1-6}$alkyl and
$R_{10}$ is hydrogen, halogen, $C_{1-4}$alkyl or $C_{1-4}$alkoxy.

More preferably E is $E_{2a}$ is unsubstituted $C_{2-3}$alkylene, monohydroxy-substituted $C_{3-4}$alkylene or —$Q_a$—X—$Q_a$; where each $Q_a$, independently is unsubstituted $C_{1-3}$alkylene or monohydroxy-substituted $C_{3-4}$alkylene-, and X is —$NR_{9a}$— or

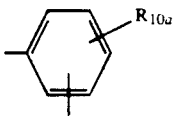

where $R_{9a}$ is hydrogen or $C_{1-4}$alkyl and $R_{10a}$ is hydrogen, chlorine, methyl or methoxy.

Most preferably E is $E_{3a}$ where $E_{3a}$ is $C_{2-3}$alkylene, monohydroxy-substituted $C_{3-4}$alkylene or —$CH_2$—$C_6H_4$—$CH_2$—.

Preferably D is $D_a$ where each $D_a$ independently is a group

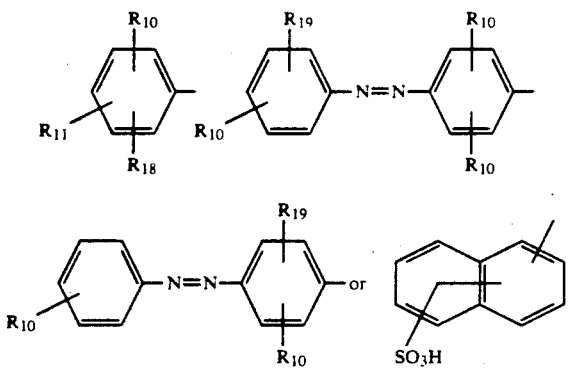

in which $R_{10}$ is defined as above; and
$R_{11}$ is hydrogen, halogen, nitro, $C_{1-4}$alkyl, —COOH,

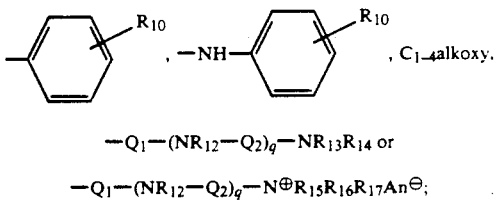

—$Q_1$—$(NR_{12}$—$Q_2)_q$—$NR_{13}R_{14}$ or

—$Q_1$—$(NR_{12}$—$Q_2)_q$—$N^{\oplus}R_{15}R_{16}R_{17}An^{\ominus}$;

in which
$Q_1$ is a direct bond or a bridging group;
$Q_2$ is $C_{2-8}$alkylene, hydroxy-substituted $C_{3-6}$alkylene, $C_{1-6}$alkylene-(1,3 or 1,4-phenylene)— or 1,3- or 1,4-phenylene-;
$R_{12}$ is hydrogen or $C_{1-4}$alkyl;
q is 0 or 1;
$R_{13}$ and $R_{14}$ independently are hydrogen, unsubstituted $C_{1-6}$alkyl; $C_{2-6}$alkyl monosubstituted by hydroxy or cyano; phenyl unsubstituted or sbustitited byone to three substituents selected from chlorine, $C_{1-4}$alkyl and $C_{1-4}$alkoxy; or phenyl ($C_{1-4}$alkyl), the phenyl ring is unsubstituted or substituted by one to three sustituents selected from chlorine, $C_{1-4}$alkyl and $C_{1-4}$alkoxy; unsubstituted $C_{5-6}$cycloalkyl or $C_{5-6}$cycloalkyl which is substituted by one to three $C_{1-4}$alkyl groups;
or —$NR_{13}R_{14}$ forms a 5- or 6-membered ring which may contain 1 or 2 additional hetero atoms selected from nitrogen, oxygen and sulfur and which ring is unsubstituted or substituted by one or two $C_{1-4}$alkyl groups;
$R_{15}$ and $R_{16}$, independently of one another, have one of the significances of $R_{13}$ and $R_{14}$ independent of $R_{13}$ and $R_{14}$, except hydrogen; and
$R_{17}$ is $C_{1-4}$alkyl or benzyl; or
—$\oplus R_{15}R_{16}R_{17}$ form a pyridinium ring which is unsubstituted or substituted by one or two methyl groups or a 5- or 6-membered ring which may contain 1 or 2 additional hetero atoms selected from nitrogen, oxygen and sulfur, the cationic nitrogen atom having an $R_{17}$ group, which ring is unsubstituted or substituted by one or two $C_{1-4}$alkyl groups;
$An^{\ominus}$ is a non-chromophoric anion;
$R_{18}$ is hydrogen or $SO_3H$; and
$R_{19}$ is hydrogen, $SO_3H$, COOH, or $SO_2NH_2$.

More preferably D is a group $D_b$ where each $D_b$ independently is a group

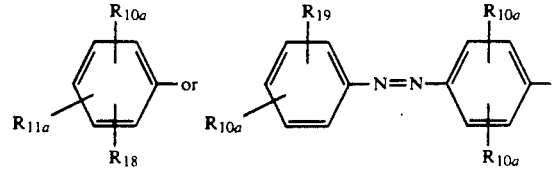

in which
$R_{10a}$ is hydrogen, chlorine, methyl or methoxy; and
$R_{11a}$ is hydrogen, chlorine, nitro, methyl, methoxy

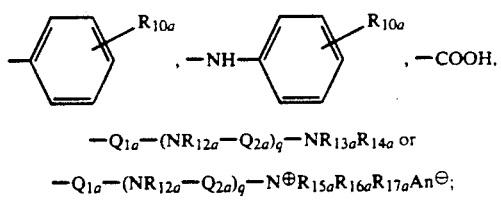, 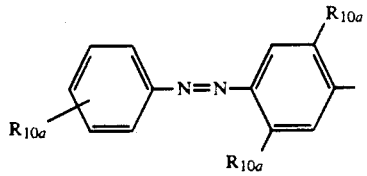

$-Q_{1a}-(NR_{12a}-Q_{2a})_q-NR_{13a}R_{14a}$ or $-Q_{1a}-(NR_{12a}-Q_{2a})_q-N^{\oplus}R_{15a}R_{16a}R_{17a}An^{\ominus}$;

in which
q is 0 or 1;

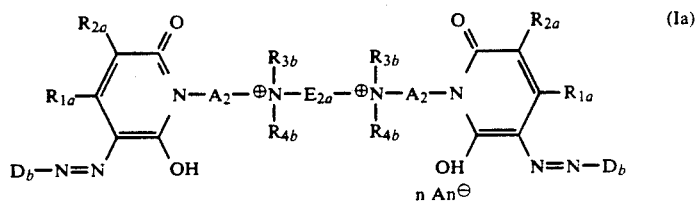

where the symbols are as defined above.

Preferred compounds of formula I are those of formula Ia

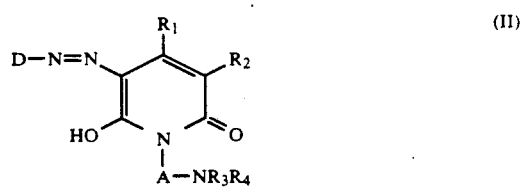

in which when $D_b$ contains one anionic group, the total number of the cationic groups present in the molecule exceeds the number of the anionic groups in both groups $D_b$.

Preferably in compounds of formula Ia, $R_{1a}$ is $R_{1b}$ and $R_{2a}$ is $R_{2b}$ (more preferably where $R_{1a}$ is methyl and $R_{2a}$ is $R_{2c}$).

Preferably in compounds of formula Ia $A_2$ is $A_3$.

Preferably in compounds of formula Ia $E_{2a}$ is $E_{3a}$.

Preferably in compounds of formula Ia $D_b$ is $D_c$ or $D_d$.

Preferably in compounds of formula Ia $R_{3b}$ and $R_{4b}$ are methyl.

Preferably the compound of formula Ia is symmetrical around $E_{2a}$.

Further according to the invention, there is provided a process for preparing compounds of formula I, comprising (a) reacting two moles of the same compound of formula II, or one mole of two different compounds of formula II $Q_{1a}$ is a direct bond, —CO—, 13 *N($R_{12a}$)—NH—COCH$_2$— or —SO$_2$—; in which the * atom is bonded to a C-atom of the benzene ring (to which $R_{11}$ is attached), $Q_{2a}$ is $C_{2-3}$alkylene, $R_{12a}$ is hydrogen or methyl, $R_{13a}$ and $R_{14a}$, independently of one another, are hydrogen, methyl or ethyl, $R_{15a}$ and $R_{16a}$, independently of one another, are methyl or ethyl;

$R_{17a}$ is methyl, ethyl or benzyl, or $R_{13a}$ and $R_{14a}$ or $R_{15a}$ and $R_{16a}$ together with the N-atom to which they are attached, form a piperidine, peiperazine or morpholine ring, or $R_{15a}$, $R_{16a}$ and $R_{17a}$ together with the N-atom to which they are attached, form a pyridinium ring which may be substituted by methyl.

More preferably D is a group $D_c$, where each $D_c$, independently, is

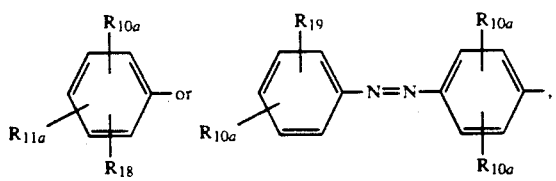

in which $R_{11b}$ is hydrogen, chlorine, nitro, methyl, methoxy, phenyl, —NH—phenyl, —SO$_2$NH$_2$, —CON($R_{12a}$)—Q$_{2a}$—NR$_{13a}$R$_{14a}$, or $$-\text{CON}(R_{12a})-Q_{2a}-\overset{\oplus}{N}R_{15a}R_{16a}R_{17a};$$
$$An^{\ominus}$$

and the other symbols are as defined above.

Most preferably D is $D_d$ where each $D_d$ independently is

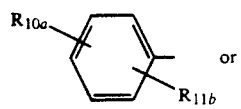

with the one mole of an E-yielding compound thereby quaternising the NR$_3$R$_4$ group of each compound of formula II; or (b) when it is desired to prepare a compound of formula I in which both D are identical, coupling two moles of the diazotised amine of formula III

D—NH$_2$ (III)

with one mole of a compound of formula IV

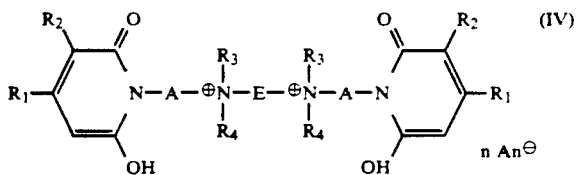

in which the symbols are as defined above.

Diazotisation and coupling reactions can be carried out in accordance with known methods. Preferably coupling is effected at a slightly acidic pH.

The condensation of two compounds of formula II is conveniently carried out at an elevated temperature of 40° to 70° C., preferably 50° to 60° C., and in an alkaline medium, preferably at pH 9 to 10.

A compound of formula I may be isolated from the reaction mixture in a known manner or may be used per se in the form of the solution obtained, i.e. without isolation from the reaction mixture.

A compound of formula IV, used as a coupling component, may be obtained by an analogous process to that for preparing a compound of formula I, comprising reacting two moles of a compound of formula V or one mole of two different compounds of formula V

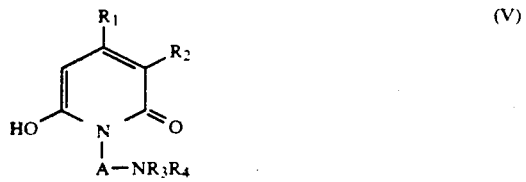

with one mole of an E-yielding compound thereby quaternising the $NRR_4$ group of each compound of formula IV.

The compounds of formulae II, III and V used to synthesize the compounds of formulae I and IV are known or may be obtained by known methods from known compounds.

The compounds of formula I may be in the form of water-soluble salts and some can also form inner salts. An anion $An^{\ominus}$, that can be introduced by reacting a protonatable N-atom and/or quaternary ammonium group with organic or inorganic acid, may be for example one of the following:

Chloride, bromide, iodide, sulphate, bisulphate, methyl sulphate, ethyl sulphate, amino sulphate, hydrogen sulphate, perchlorate, benzenesulphonate, oxalate, maleinate, acetate, methoxyacetate, formate, propionate, lactate, succinate, tartrate, malate, methanesulphonate, the anions of acids such as boric acid, citric acid, glycolic acid, diglycolic acid or adipic acid or addition products of ortho-boric acid with polyalcohols, e.g. cis-polyols.

The compounds of formula I in water-soluble salt form can be used as dyestuffs for dyeing or printign hydroxy group-containing or nitrogen-containing organic substrates. They can for example be used for dyeing or printing cationically dyeable materials such as single or mixed polymers of acrylonitrile, acid-modified polyamide or polyester fibres; leather, cotton or bast fibres such as hemp, flax, sisal, jute, coir fibres and straw; regenerated cellulose fibres, glass fibres and paper.

The compounds of the formula I can also be used, for example, for dyeing or printing fibres, filaments or textiles produced therefrom, which consist of or contain cellulose material, e.g. cotton, according to known methods. One preferred method known for dyeing cotton is a conventional exhaust process, for example from a long or short bath and at room temperature to boiling temperature. One preferred method for effecting printing employs impregnation with a printign paste which can be prepared by known methods.

The compounds of the formula I can also be used for the dyeing or printing of leather by known methods and in particular of low-affinity types of leather which have undergone vegetable retanning.

The compounds of formula I are especially suitable for dyeing or printing paper or paper products, e.g. for the production of sized or unsized, wood-free or in particular wood-containing paper (so-called mechanical wood pulp) in pulp form such as in the sizing press. Dyeing and printing of paper may be effected by known methods. A preferred method for the dyeing of paper uses a dipping process.

The dyeings and prints obtained, and in particular the paper dyeings and paper prints, have good fastness during usage.

The compounds of formula I may be used directly (in powder form or as a solution) as dyestuffs, or may be used in the form of dyeing preparations. The processing into stable liquid, preferably aqueous, and solid dyeing preparations mayb e carried out by known methods. For example, suitable liquid preparations may be obtined by dissolving the dyestuff of formula I in suitable solvents such as mineral acids or organic acids, e.g. hydrochloric acid, sulphuric acid, phosphoric acid, formic acid, acetic acid, lactic acid, glycolic acid, methane sulphonic acid and citric acid, or further solvents such as fomamide, dimethylformamide, urea; glycols and their ethers which are used in a mixture with water, optionally with an assistant, e.g. a stabilizer. Such preparations may be produced for example as described in French Patent Specification No. 1,372,030.

A preferred liquid preparation is, for example, as follows (parts are by weight):
100 parts of a compound of formula I,
1-100, preferably 1-10, parts of an inorganic salt,
1-100 parts of an organic acid such as formic, acetic, lactic, citric, propionic and/or methoxyacetic acid,
100-800 parts of water,
0-500 parts of a solvent assistant (e.g. glycols such as ethylene glycol, propylene glycol, di- or triethylene glycol, hexylene glycol; glycol ethers such as methyl cellosolve, methyl carbitol, butyl polyglycol; urea, formamide and/or dimethylformamide).

Similarly, the compounds of formula I can be processed in known manner into solid, preferably granulated dyeing preparations, advantageously by granulating as described in French Patent Specification No. 1,581,900.

A preferred composition for solid preparation is, for example, as follows (all parts are by weight):
100 parts of a compound of formula I,
1-100, preferably 1-10, part of an inorganic salt,
0-800 parts of a standardising agent (preferably nonionic such as dextrin, sugar, grape sugar and urea).

The solid preparation may contain up to 10% residual moisture.

The compounds of formula I have good solubility properties and are especially notable for their good solubility in cold water. As a result of their high substantivity, the dyestuffs are absorbed practically quantitatively and thus have good build-up. When producing sized and unsized paper, the waste water is practically colourless or is only slightly coloured. The dyestuffs can be added to the paper pulp directly, i.e. without predissolving, as a dry powder or granulate, without any reduction in brillance or in the yield of colour.

The compounds of formula I are preferably used however in solution or as liquid-aqueous dyeing preparations.

Compared with unsized paper dyeings, the sized paper dyeings show no loss of depth.

The compounds of formula I can also be used for dyeing in soft water with a full yield of color. The compounds of formula I do not mottle especially when dyed on wood-containing paper; they are not inclined to produce two-sided effects on paper and are substantially insensitive towards fillers and pH variations.

The dyed papers and especially those dyed purely with a cationic compound of the formula I have a high level of fastness to bleeding. They have very good west fastness not only to water, but also to milk, fruit juies, sweetened mineral water, soap water, tonic water, sodium chloride solution, and urine. In addition, they have good alcohol fastness.

Paper which has been dyed with the compounds of formula I can be bleached both by oxidation and by reduction, which is important for the re-use of broke and old paper.

Fibrous materials containing mechanical wood pulp are dyed by the present dyestuffs in a good and even quality.

The following examples illustrate the invention. In the examples, all parts and percentages are by weight unless indicated to the contrary and all temperatures are given in degrees celsius.

EXAMPLE 1

(a) 143.5 parts of 6-hydroxy-4-methyl-1-(3'-dimethylamino)propyl-3-pyridiniumpyridone-(2)-betaine, 400 parts of water and 25 parts of 30% hydrochloric acid are placed in a reaction flask. This is heated to 50°–60° and then 27.8 parts of epichlorohydrin are added dropwise to the reaction solution. The pH is maintained at between 9 and 10 by adding ca. 20 parts of 30% sodium hydroxide solution. After stirring for about 30 minutes, the pH remains unchanged. An aqueous solution of the pyridone compound of formula 1b

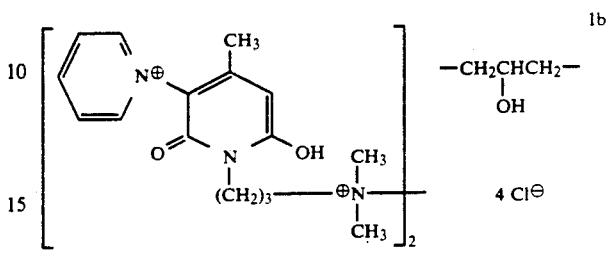

may be used further as a coupling component without isolation.

(b) 39.4 parts of 4-amino-1,1'-azobenzene are diazotised by a known method in a solution containing hydrochloric acid and are coupled at pH 4 with 77.6 parts of the coupling component of formula 1b produced under (a). The dyestuff of formula 1a result

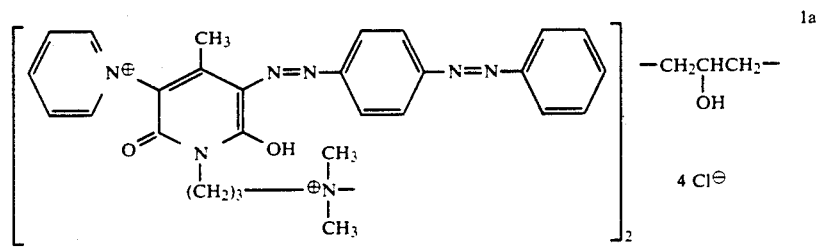

It can be used without isolation as a solution for dyeing paper.

The yellowish-orange paper dyeings obtained have good fastness.

EXAMPLE 2

13.3 parts of the compound of formula 2b,

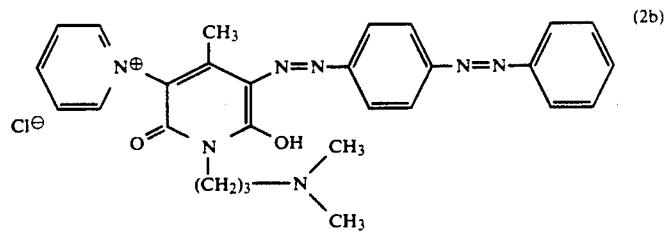

produced by a known method by diazotising and coupling of 4-amino-1,1'-azobenzene with 6-hydroxy-4-methyl-1-(3'-dimethylamino)propyl-3-pyridiniumpyridone-(2)-betaine, are made into a paste in 200 parts of water. A pH of 9-10 is set by the addition of sodium hydroxide solution. 2.2 parts of α,α'-dichloro-p-xylene are added to this reaction mixture which is heated to 60°. After stirring for three hours, the reaction is terminated. The resultant dyestuff is of formula 2a

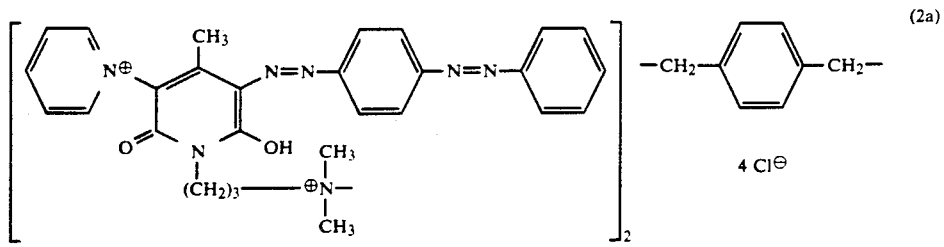

and is obtained by precipitating with acetone and subsequently filtering. It dyes paper in orange shades. The dyeings have a good level of fastness.

EXAMPLES 3

If in step b of Example 1, 18.6 parts of aminobenzene are used in place of the 39.4 parts of 4-amin-1,1-azobenzene, a compound of formula 3a

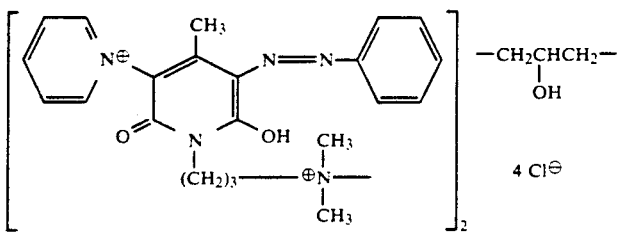

results. This can be used as a dyestuff without the need to isolate the dyestuff. The resultign paper dyeings are yellow and have good fastness properties, especially good wet fastness properties.

EXAMPLES 4 to 84

Further compounds of formula 4a $$\begin{bmatrix} \text{structure 4a} \end{bmatrix} -E- \quad 4 An^{\ominus}$$

in which the symbols are as defined in Table 1 below are produced analogously to the method described in Example 1 or 2, from appropriate corresponding starting materials.

Further, compounds of formula 4b $$\begin{bmatrix} \text{structure 4b} \end{bmatrix} -E- \quad 2 An^{\ominus}$$

in which the symbols are as defined in Table 2 are produced analogously to the method described in Example 1 or 2, from appropriate corresponding starting materials.

$An^{\ominus}$ signifies a non-chromophoric anion, as originally existing in the reaction medium, preferably $Cl^{\ominus}$ or $CH_3COO^{\ominus}$.

When dyed on paper, these dyestuffs produce yellow-orange to orange dyeings, which have a high level of fastness, especially regarding waste water and wet fastness.

Examples 4 to 24, 33, 34, 38, 39 and 71-84 produce yellow dyeings on paper. The remaining Examples produce yellowish - orange dyeings on paper.

In Examples 14-18 inner salts may be formed.

In the following Tables $E_1$ to $E_4$ are as follows:

$E_1$ is $-CH_2-CH(OH)-CH_2-$ $E_2$ is $-CH_2-CH_2-$.

$E_3 =$

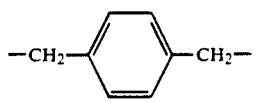

$E_4 =$

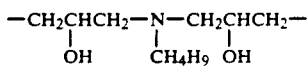

TABLE 1

| Ex. No. | D | R₃ | E |
|---|---|---|---|
| 4 | phenyl | CH₃ | E₂ |
| 5 | " | " | E₃ |
| 6 | " | C₂H₅ | E₁ |
| 7 | o-tolyl | CH₃ | E₁ |

TABLE 1-continued

| Ex. No. | D | R₃ | E |
|---|---|---|---|
| 8 | " | " | $E_3$ |
| 9 | 2-Cl-phenyl | " | $E_1$ |
| 10 | " | $C_2H_5$ | $E_1$ |
| 11 | 2,3-dimethyl-phenyl | $CH_3$ | $E_1$ |
| 12 | " | " | $E_3$ |
| 13 | " | " | $E_4$ |
| 14 | 2-SO₃H-phenyl | " | $E_1$ |
| 15 | " | $C_2H_5$ | $E_2$ |
| 16 | " | $CH_3$ | $E_3$ |
| 17 | 4-HO₃S-phenyl | $CH_3$ | $E_1$ |
| 18 | " | " | $E_2$ |
| 19 | 2-COOH-phenyl | " | $E_1$ |
| 20 | " | $C_2H_5$ | $E_3$ |
| 21 | 4-HOOC-phenyl | $CH_3$ | $E_1$ |
| 22 | 4-H₂NO₂S-phenyl | " | $E_1$ |
| 23 | " | $C_2H_5$ | $E_1$ |
| 24 | " | $CH_3$ | $E_3$ |
| 25 | 4-CH₃O-phenyl | $CH_3$ | $E_1$ |
| 26 | " | $C_2H_5$ | $E_1$ |
| 27 | " | $CH_3$ | $E_2$ |
| 28 | " | " | $E_3$ |
| 29 | " | " | $E_4$ |
| 30 | 2-OCH₃-phenyl | " | $E_1$ |
| 31 | " | $C_2H_5$ | $E_2$ |
| 32 | " | $CH_3$ | $E_3$ |
| 33 | 4-O₂N-phenyl | " | $E_1$ |
| 34 | " | " | $E_3$ |
| 35 | 4-H₃C-phenyl | $CH_3$ | $E_1$ |
| 36 | " | " | $E_2$ |
| 37 | " | " | $E_4$ |
| 38 | 4-Cl-phenyl | " | $E_1$ |
| 39 | " | $C_2H_5$ | $E_3$ |
| 40 | 4-(phenyl-NH)-phenyl | $CH_3$ | $E_1$ |
| 41 | " | " | $E_3$ |
| 42 | 3-OCH₃-4-O₂N-phenyl | " | $E_1$ |
| 43 | " | $C_2H_5$ | $E_1$ |
| 44 | 3-NO₂-4-CH₃O-phenyl | $CH_3$ | $E_1$ |
| 45 | " | " | $E_3$ |
| 46 | 4-biphenyl | " | $E_1$ |
| 47 | " | " | $E_4$ |
| 48 | 2-OCH₃-4-CH₃-phenyl | " | $E_1$ |
| 49 | " | " | $E_3$ |

TABLE 1-continued

| Ex. No. | D | R₃ | E |
|---|---|---|---|
| 50 | 2,4-dimethoxyphenyl | CH₃ | E₁ |
| 51 | " | " | E₂ |
| 52 | 4-(phenylazo)phenyl | " | E₂ |
| 53 | " | C₂H₅ | E₁ |
| 54 | " | CH₃ | E₄ |
| 55 | 2-methoxy-4-[(2-methoxyphenyl)azo]-5-methylphenyl | " | E₁ |
| 56 | " | " | E₃ |
| 57 | 2,5-dimethyl-4-[(4-methylphenyl)azo]phenyl | " | E₁ |
| 58 | " | " | E₂ |
| 59 | " | " | E₃ |
| 60 | 2,5-dimethyl-4-(phenylazo)phenyl | " | E₁ |
| 61 | " | " | E₃ |
| 62 | " | " | E₄ |
| 63 | 4-[(4-methoxyphenyl)azo]-2,5-dimethylphenyl | " | E₁ |
| 64 | " | C₂H₅ | E₃ |
| 65 | 2-methoxy-5-methyl-4-[(4-methylphenyl)azo]phenyl | CH₃ | E₁ |
| 66 | " | " | E₃ |
| 67 | 2-methoxy-3-methyl-4-[(4-methylphenyl)azo]-5-methylphenyl | CH₃ | E₄ |
| 68 | 2-methoxy-6-methyl-4-(phenylazo)phenyl | " | E₁ |
| 69 | " | " | E₂ |
| 70 | " | " | E₃ |

TABLE 2

| Ex. No. | R | R₃ | E |
|---|---|---|---|
| 71 | H | CH₃ | E₃ |
| 72 | H | C₂H₅ | E₃ |
| 73 | H | CH₃ | E₁ |
| 74 | H | " | E₂ |
| 75 | 4-CH₃ | " | E₃ |
| 76 | " | C₂H₅ | E₃ |
| 77 | " | CH₃ | E₁ |
| 78 | 3-SO₂NH₂ | " | E₃ |
| 79 | " | C₂H₅ | E₃ |
| 80 | " | CH₃ | E₁ |
| 81 | 4-CONH(CH₂)₃N(C₂H₅)₂ | " | E₁ |
| 82 | " | " | E₃ |
| 83 | " | " | E₂ |
| 84 | 4-CH₃ | " | E₄ |

The uses of the dyestuffs described are illustrated in the following Dyeing Examples.

DYEING EXAMPLE A 70 parts of chemically bleached sulphite cellulose of pinewood and 30 parts of chemically bleached sulphite cellulose of birchwood are ground in a Holländer in 2000 parts of water. 0.5 parts of the dyestuff solution of the compound of formula 1a (as produced in Example 1) are added to this mass, or 0.1 parts of the dyestuff of Example 2 are sprinkled in. After mixing for 20 minutes, apper is produced therefom. The absorbent paper obtained in this way is dyed yellowish-orange. The waste water is colourless.

DYEING EXAMPLE B 0.5 parts of the dyestuff solution of the compound of formula 1a (as produced in Example 1) or 0.2 parts of the compound of formula 2a (as produced in Example 2) are added to 100 parts of chemically bleached sulphite cellulose, which have been ground in a Hollanänder in 2000 parts of water. After thorough mixing for 15 minutes, sizing takes place in the usual way with rosin size and aluminum sulphate. Paper which is produced from this material has a yellowish-orange shade and possesses good waste water and wet fastness.

DYEING EXAMPLE C

An absorbent length of unsized paper is drawn through a dyestuff solution of the following composition at 40°-50°:

0.5 parts of the compound of formula 1a (as produced in Example 1) or 0.2 parts of the compound of formula 2a (as produced in Example 2)
0.5 parts of starch and
99.0 (99.3) parts of water.

The excess dyestuff solution is squeezed out through two rollers. The dried length of paper is dyed yellowish-orange and has a high level of fastness.

Dyeing may also take place analogously to Examples A to C, using the dyestuffs of Examples 3-62 or liquid preparations thereof. The yellowish-orange to orange paper dyeings obtained have a high level of fastness.

DYEING EXAMPLE D 1.0 part of the compound of formula 2a (as produced in Example 2) is dissolved at 40° in 4000 parts of softened water. 100 parts of premoistened cotton fabric are added to the bath, which is heated in 30 minutes to boiling temperature. The bath is held at boiling temperature for one hour, whereby the water which evaporates is replaced from time to time. The dyed fabric is then removed from the liquor, rinsed with water and dried. The dyestuff is absorbed practically quantitatively on the fibres and the dyebath is alsmot colourless. A yellowish-orange dyeing with good fastness is obtained.

DYEING EXAMPLE E 100 parts of freshly tanned and neutralised chrome grain leather are drummed for 30 minutes in a vat containing a bath of 250 parts of water of 55° and 0.5 parts of the compound of formula 2a (as produced in Example 2) and are treated in the same bath for a further 30 minutes with 2 parts of an anionic fat liquor based on sulphonated train oil. The leathers are dried and finished in the usual way. An evenly dyed leather in orange shades is obtained.

Further low affinity, vegetable-retanned leathers may similarly be dyed by known methods.

DYEING EXAMPLE F

A dry substance consisting of 60% mechanical wood pump and 40% unbleached sulphite cellulose is mxied in a Holländer with sufficient water and ground to a grinding degree of 40°SR (Schopper-Riegler degree), such that the dry content is a little above 2.5%; the mixture is subsequently adjusted with water to exactly 2.5% dry content of thick substance.

200 parts of this thick substance are mixed with 5 parts of a 0.25% aqueous solution of the compound of formula 1a (as produced in Example 1) and stirred for ca. 5 minutes. After adding 2% rosin size and 4% alum (based on dry substance), homogeneous stirring again takes place for a few minutes. The pulp is diluted with ca. 500 parts of water to 700 parts and paper sheets are produced therefrom in known manner by passing through a sheet former. The paper sheets have an intensively yellowish-orange shade.

DYEING EXAMPLE G 15 parts of old paper (woody), 25 parts of bleached mechanical wood pulp and 10 parts of unbleached sulphate cellulose are impacted in a pulper to a 3% aqueous pulp suspension. The pulp suspension is diluted to 2% in a dyeing vat. Then, (calculated on total dry fibres) 5% kaolin and 0.6 parts of a 5% acetic solution of the compound of formula 1a (as produced in example 1) are added to this suspension after one another whilst stirring. After 20 minutes, 1% (calculated on dry weight of the total fibres) of a rosin size dispersion is added to the pump in the mixing vat. The homogeneous pulp suspension is adjusted to pH 5 with alum on the paper machine shortly before operating.

In this way, orange-dyed bag paper of 80 g/m² with a machine finish is produced on the paper machine. The dyed paper has very good bleeding fastness in accordance with DIN 53 991. The paper can be almost totally decolourised with hypochlorite.

Dyeing Examples A to G can be repeates using instead of the compound of formula 1a or 2a an appropriate amount of any one of Examples 3 to 84. In all cases, the waste water shows only a slight concentration of dyestuff.

What is claimed is:

1. A compound of the formula

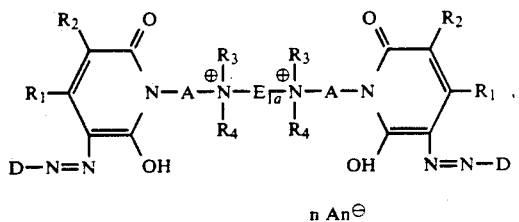

n An$^{\ominus}$ or a mixture thereof, wherein
each A is independently linear or branched $C_{2-6}$alkylene or linear or branched $C_{3-6}$alkylene substituted by hydroxy,
each D is independently the radical of a diazo component of the benzene, azobenzene or naphthalene series,
$E_{1a}$ is linear or branched $C_{2-4}$alkylene; linear or branched $C_{3-4}$alkylene monosubstituted by hydroxy; linear or branched $C_{2-6}$alkylene interrupted by —O—, —NR$_9$— or

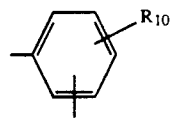

or linear or branched $C_{3-8}$alkylene monosubstituted or disubstituted by hydroxy and interrupted by —O—, —NR$_9$— or

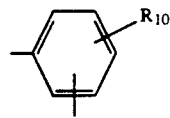

wherein
$R_9$ is hydrogen or $C_{1-6}$alkyl, and
$R_{10}$ is hydrogen, halo, $C_{1-4}$alkyl or $C_{1-4}$alkoxy,
each $R_1$ is independently hydrogen, $C_{1-4}$alkyl, cyclohexyl, phenyl or phenyl($C_{1-2}$alkyl),
each $R_2$ is independently hydrogen, cyano, —COOR$_5$, —CONR$_6$R$_7$ or

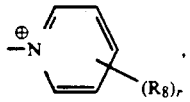

wherein
$R_5$ is hydrogen, $C_{1-4}$alkyl or phenyl($C_{1-2}$alkyl),
each of $R_6$ and $R_7$ is independently hydrogen or $C_{1-4}$alkyl,
each $R_8$ is independently $C_{1-4}$alkyl, and r is 0, 1, 2 or 3,
each $R_3$ is independently $C_{1-4}$alkyl or $C_{1-4}$alkyl monosubstituted by halo, cyano, hydroxy or phenyl,
each $R_4$ is independently hydrogen, $C_{1-4}$alkyl or $C_{1-4}$alkyl monosubstituted by halo, cyano, hydroxy or phenyl
each $An^\ominus$ is a non-chromophoric anion, and
n is, 1, 2, 3, 4, 5 or 6,
with the proviso that the negative charges of the $An^\ominus$'s balance the positive charge of each cationic group of the molecule not balanced by the negative charge of an anionic group of the molecule.

2. A compound according to claim 1.
3. A compound according to claim 2 wherein each D is independently the radical of a diazo component of the benzene, azobenzene or naphthalene series containing a substitutent selected from sulfo, carboxy and sulfamoyl.
4. A compound according to claim 2 wherein each halo is fluoro, chloro or bromo, with the provisos that (i) the number of cationic groups exceeds the number of anionic groups, and (ii) each hydroxy substituent of each alkyl group and alkylene radical bonded to a nitrogen atom is bonded to a carbon atom that is not directly bonded to a nitrogen atom.
5. A compound according to claim 2 wherein each $R_1$ is independently methyl, ethyl, cyclohexyl, phenyl or benzyl.
6. A compound according to claim 2 wherein each $R_2$ is independently hydrogen, cyano, —COOR$_{5a}$,

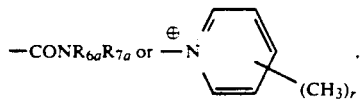

wherein each of $R_{5a}$, $R_{6a}$ and $R_{7a}$ is independently hydrogen, methyl or ethyl.
7. A compound according to claim 2 wherein
each $R_3$ is independently methyl, ethyl or 2-hydroxyethyl, and
each $R_4$ is independently hydrogen, methyl, ethyl or 2-hydroxyethyl.
8. A compound according to claim 2 wherein
each A is independently is linear or branched $C_{2-4}$alkylene or linear or branched $C_{3-4}$alkylene monosubstituted by hydroxy.
9. A compound according to claim 2 wherein each D is independently

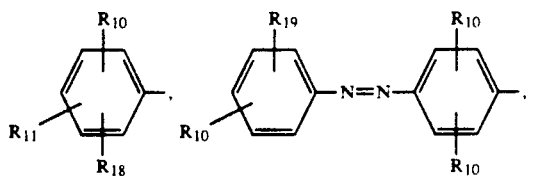

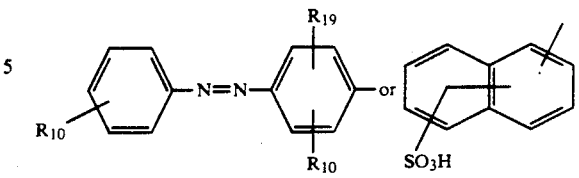

wherein
$R_{11}$ is hydrogen, halo, nitro, $C_{1-4}$alkyl, $C_{1-4}$alkoxy, carboxy, —Q$_1$—(NR$_{12}$—Q$_2$)$_q$—NR$_{13}$R$_{14}$, —Q$_1$—(NR$_{12}$—Q$_2$)$_q$—NR$^\oplus_{15}$R$_{16}$R$_{17}$,

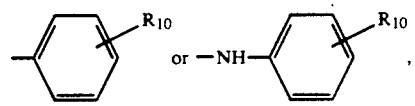

$R_{18}$ is hydrogen or sulfo, and
$R_{19}$ is hydrogen, sulfo, carboxy or sulfamoyl,
wherien
$Q_1$ is a direct bond, —CO—, —NR$_{12a}$—NH-COCH$_2$— or —SO$_2$—, wherein R$_{12a}$ is hydrogen or methyl, and the * denotes the atom that is bonded to a carbon atom of the ring to which R$_{11}$ is bonded,
$Q_2$ is linear or branched $C_{2-8}$alkylene; linear or branched $C_{3-6}$alkylene substituted by hydroxy; linear or branched $C_{1-6}$alkylene-1,3-phenylene; linear or branched $C_{1-6}$alkylene-1,4-phenylene; 1,3-phenylene or 1,4-phenylene,
each
$R_{10}$ is independently hydrogen, halo, $C_{1-4}$alkyl or $C_{1-4}$alkoxy,
$R_{12}$ is hydrogen or $C_{1-4}$alkyl,
each of $R_{13}$ and $R_{14}$ is independently hydrogen; $C_{1-6}$alkyl; $C_{2-6}$alkyl monosubstituted by hydroxy or cyano; phenyl; phenyl substituted by one to three substituents selected from chloro, $C_{1-4}$alkyl and $C_{1-4}$alkoxy; phenyl($C_{1-4}$alkyl); phenyl($C_{1-4}$alkyl) the phenyl ring of which is substituted by one to three substituents selected from chloro, $C_{1-4}$alkyl and $C_{1-4}$alkoxy; Chd 5-6cycloalkyl; or $C_{5-6}$cycloalkyl substituted by one to three $C_{1-4}$alkyl group; or
—NR$_{13}$R$_{14}$ is piperidino; piperazino; morpholino; or piperidino, piperazino or morpholino substituted by one or two $C_{1-4}$alkyl gruops,
each of $R_{15}$ and $R_{16}$ is independently $C_{1-6}$alkyl; $C_{2-6}$alkyl monosubstituted by hydroxy or cyano; phenyl; phenyl substituted by one to three substituents selected from chloro, $C_{1-4}$alkyl and $C_{1-4}$alkoxy; phenyl($C_{1-4}$alkyl); phenyl($C_{1-4}$alkyl) the phenyl ring of which is substituted by one to three substituents selected from chloro, $C_{1-4}$alkyl and $C_{1-4}$alkoxy; $C_{5-6}$cycloalkyl; or $C_{5-6}$cycloalkyl substituted by one to three $C_{1-4}$alkyl groups, R$_{17}$ is $C_{1-4}$alkyl or benzyl, or $\ominus$
—NR$_{15}$R$_{16}$R$_{17}$ is pyridinium; methylpyridinium; dimethylpyridinium; N-R$_{17}$-piperidinium; N-R$_{17}$-piperazinium; N-R$_{17}$-morpholinum; or N-R$_{17}$-piperidinium, N-R$_{17}$-piperazinium or N-R$_{17}$-morpholinium substituted by one or two $C_{1-4}$alkyl groups, wherein R$_{17}$ is $C_{1-4}$alkyl or benzyl, and
q is 0 or 1.

10. A compound according to claim 9 having the formula

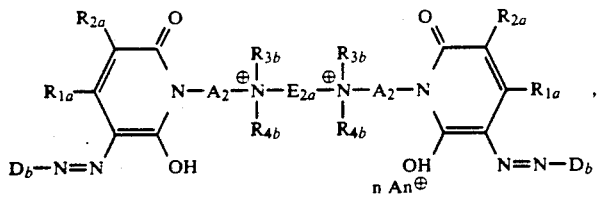

wherien
each $A_2$ is independently linear or branched $C_{2-4}$alkylene,
each $D_b$ is independently

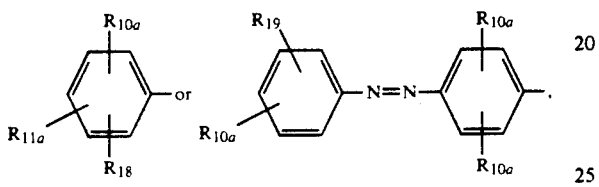

wherein
$R_{11a}$ is hydrogen, chloro, nitro, methyl, methoxy, carboxy, $-Q_{1a}-(NR_{12a}-Q_{2a})_q-NR_{13a}R_{14a}$ $-Q_{1a}-(NR_{12a}-Q_{2a})_q-\overset{\oplus}{N}R_{15a}R_{16a}R_{17a}$

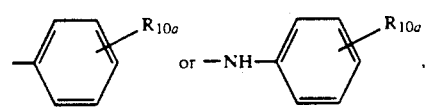

wherien
$Q_{1a}$ is a direct bond, —CO—, —NR$_{12a}$—NH-COCH$_2$— or —SO$_2$—,
wherein
the * denotes the atom that is bonded to a carbon atom of the ring to which $R_{11a}$ is bonded,
$Q_{2a}$ is linear or branched $C_{2-3}$alkylene,
each of $R_{13a}$ and $R_{14a}$ is independently hydrogen, methyl or ethyl, or
—NR$_{13a}$R$_{14a}$ is piperidino, piperazino or morpholino,
each of $R_{15a}$ and $R_{16a}$ is independently methyl or ethyl, and
$R_{17a}$ is methyl, ethyl or benzyl, or
—NR$\oplus_{15a}$R$_{16a}$R$_{17a}$ is pyridinium, methylpyridinium, N-R$_{17a}$-piperidinium, N-R$_{17a}$-piperazinium or N-R$_{17a}$-morpholinium, wherein
$R_{17a}$ is methyl, ethyl or benzyl, and
q is 0 or 1,
$R_{18}$ is hydrogen or sulfo, and
$R_{19}$ is hydrogen, sulfo, carboxy or sulfamoyl,
$E_{2a}$ is linear or branched $C_2$-alkylene; linear or branched $C_{3-4}$alkylene monosubstituted by hydroxy; or —Qa—X—Qa—, wherein each
Qa is independently linear or branched $C_{1-3}$alkylene or linear or branched $C_{3-4}$alkylene monosubstituted by hydroxy, and
X is —NR$_{9a}$— or

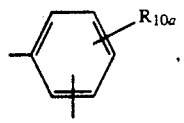

wherein
$R_{9a}$ is hydrogen or $C_{1-4}$alkyl,
each $R_{1a}$ is independently methyl, ethyl, cyclohexyl, phenyl or benzyl,
each $R_{2a}$ is independently hydrogen, cyano, —COOR$_{5a}$, —CONR$_{6a}$R$_{7a}$ or

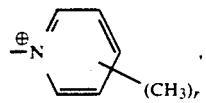

wherein
each of $R_{5a}$, $R_{6a}$ and $R_{7a}$ is independently hydrogen, methyl or ethyl, and
r is 0, 1, 2 or 3,
each $R_{3b}$ is independently methyl, ethyl or 2-hydroxyethyl,
each $R_{4b}$ is independently hydrogen, methyl, ethyl or 2-hydroxyethyl, and n is 0, 1, 2, 3, 4, 5 or 6,
wherein each $R_{10a}$ is independently hydrogen, chloro, methyl or methoxy,
$R_{12a}$ is hydrogen or methyl, and
each An$\ominus$ is a non-chromophoric anion,
with the provisos that (i) the negative charges of the An$\ominus$'s balance the positive charge of each catnionic group of the molecule not balanced by the negative charge of an anionic group of the molecule, and (ii) when a $D_b$ contains one anionic group, the total number of the cationic groups present in the molecule exceeds the number of the anionic groups in both $D_b$ groups.

11. A compound according to claim 10 with the proviso that any hydroxy substituent of an alkylene radical bonded to a nitrogen atom is bonded to a carbon atom that is not directly bonded to a nitrogen atom.

12. A compound according to claim 10 wherein
each $A_2$ is independently —(CH$_2$)$_{p'}$—,
each $D_b$ is independently

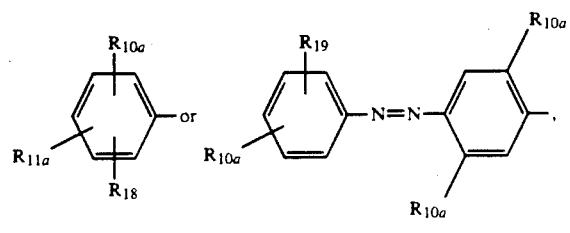

wherein $R_{11b}$ is hydrogen, chloro, nitro, methyl, methoxy, phenyl, phenylamino, sulfamoyl, —CO—NR$_{12a}$—Q$_{2a}$—NR$_{13a}$R$_{14a}$ or —CO—NR$_{12a}$—Q$_{2a}$—NR$_{15a}$R$_{16a}$R$_{17a}$, $E_{2a}$ is linear or branched $C_{2-3}$alkylene, $C_{3-4}$alkylene monosubstituted by hydroxy or —CH$_2$—phenylene—CH$_2$—, each $R_{1a}$ is independently methyl or ethyl, each $R_{2a}$ is independently hydrogen, —COOR$_{5a}$, —CONHR$_{7a}$, pyridinium or methylpyridinium, and each $R_{3b}$ and $R_{4b}$ is methyl.

13. A compound according to claim 12 wherein
the $A_2$'s are identical,
the $D_b$'s are identical,
the $R_{1a}$'s are identical, and
the $R_{2a}$'s are identical.

14. A compound according to claim 12 wherein each $R_{1a}$ is methyl,
each $R_{2a}$ is independently pyridinium or methylpyridinium,
each $R_{18}$ is hydrogen, and
each $R_{19}$ is hydrogen.

15. A compound according to claim 14 wherein
the $A_2$'s are identical,
the $D_b$'s are identical, and
the $R_{2a}$'s are identical.

16. A compound according to claim 15 with the proviso that any hydroxy substitutent of an alkylene radical bonded to a nitrogen atom is bonded to a carbon atom that is not directly bonded to a nitrogen atom.

17. A compound according to claim 16 having the formula

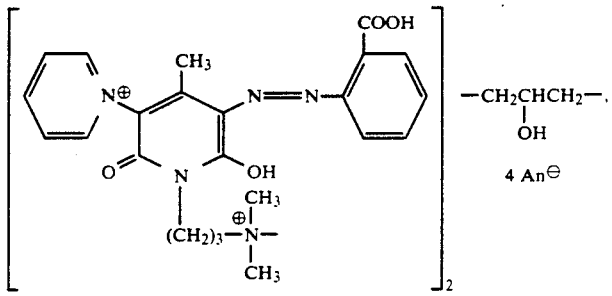

wherein each An$\ominus$ is a non-chromophoric anion.

18. A compound according to claim 17 wherien each An$\ominus$ is chloride or acetate.

19. A storage-stable, aqueous liquid dye composition containing a compound according to claim 1 in water-soluble salt form.

* * * * *